R. JONES.
Method of Preserving Animal and Vegetable Substances.
No. 51,280. Patented Nov. 28, 1865.
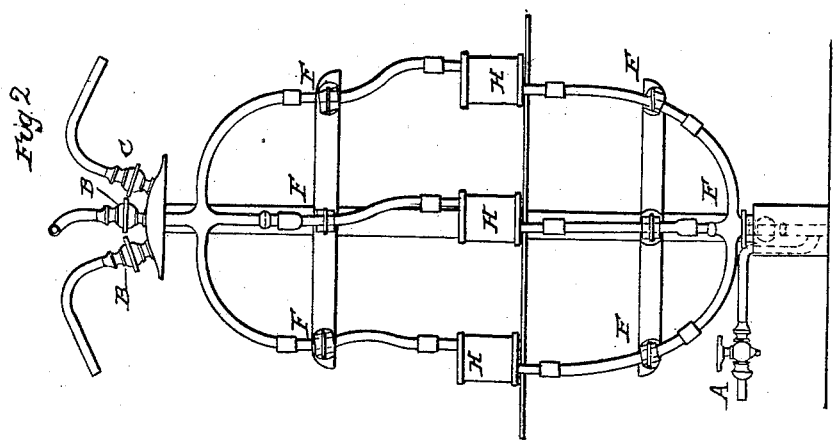
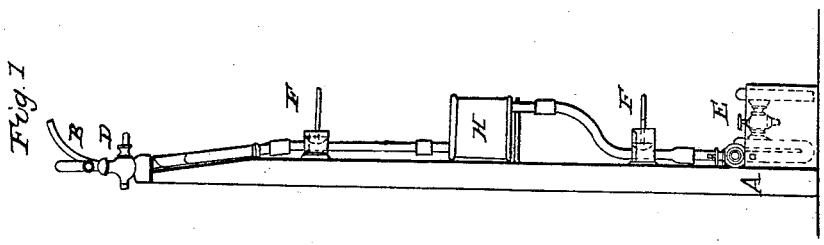
Witnesses
Sam'l McBarton
S. K. Whipple
Inventor
Richard Jones
by his Atty
Joseph Gavett

UNITED STATES PATENT OFFICE.

RICHARD JONES, OF LONDON, ENGLAND.

IMPROVED METHOD OF PRESERVING ANIMAL AND VEGETABLE SUBSTANCES.

Specification forming part of Letters Patent No. 51,280, dated November 28, 1865.

*To all whom it may concern:*

Be it known that I, RICHARD JONES, of No. 29 Botolph Lane Eastcheap, in the city of London, England, provision merchant, have invented an Improved Method of Preserving Animal and Vegetable Substances; and I do hereby declare that the following is a full and exact description thereof.

The object of my invention is to displace air from the vessel containing the animal or vegetable substance to be preserved by the introduction into such vessel of an inert fluid, such as water or oil, and then to displace such fluid by the introduction of nitrogen gas, or gases having an affinity for oxygen.

For this purpose I prefer that the vessels containing the animal or vegetable substance to be preserved be provided with two necks or passages sufficiently large to admit of the flow of the inert fluid into and from the vessel, and for the flow therein of the nitrogen gas, or gases having an affinity for oxygen; and I generally find it convenient for these vessels, excepting their necks or passages, to be formed of tin or tin-plate. The necks or passages I form of soft metal, and when the cover of these vessels has been made secure by soldering or otherwise, to retain the substances to be preserved, leaving only the necks or apertures above referred to open. I apply over each of these necks, and so as to fit tightly onto them, the ends of a pipe provided with stop-cocks or valves. India-rubber tubing I find to answer well for this purpose. One of these pipes is in communication through suitable stop-cocks or valves with a reservoir of the inert fluid, which I allow to flow into the vessel under pressure, so as to fully drive out the air contained in the vessel. The other tube is also provided with suitable stop-cocks or valves, and is in communication with the reservoir of the nitrogen gas, or gases to be employed as having an affinity for oxygen, and when I find all air has been driven off, and that only the inert fluid passes out from the vessels containing the substances to be preserved, I prevent the ingress or egress of liquid or air by means of stop-cocks or valves. I then allow the nitrogen gas, or gases having an affinity for oxygen—such as carbonic-acid gas or nitrogen gas with binoxide of nitrogen—to flow therein under pressure from the reservoir until the whole of the inert fluid has been displaced, and I then introduce a given quantity of sulphurous-acid gas or binoxide of nitrogen—say of from five to thirty-five cubic inches to the pound of substance to be preserved. And in some cases I repeat the operation by employing the inert fluid to drive off the nitrogen gas, or gases having affinity for oxygen, and then the inert fluid is again driven off by the nitrogen gas, or gases having affinity for oxygen.

The nitrogen gas or the gases so employed may be collected as driven off in suitable reservoirs for reuse.

When the operations are thus completed I, by means of pinchers or otherwise, close up the necks or passages of the vessels, and make them secure by soldering or other sealing, as is well understood by persons accustomed to preserving animal and vegetable substances.

One mode of operating my invention is represented in the accompanying plate of drawings, Figure 1 being a side and Fig. 2 a front view of an apparatus adapted to the purpose.

The operation is as follows: The meat is placed in the tins H H, the india-rubber or other flexible tubes fitted onto the tins. The tap A is then opened, the water will flow in, and the air escape through the tube B. When water passes through it shows all air is displaced. Then close A and B and open C and E. The gas will pass in through C and water out through E. When all is escaped close both taps and screw down F F F, &c., and then measure in a given quantity sulphurous-acid gas through tube D, unscrewing each F separately. Then, having screwed up F, compress each metal tube by means of a suitable pincher, slip off the india-rubber tube, and solder up.

Having thus described my invention and means which I adopt in carrying the same into effect, I would observe that I do not wish to be understood as claiming, broadly, the use for the purpose described of gases having affinity for oxygen, nor the displacement of the air by the employment of liquid fluids; but

What I claim is—

The herein-described apparatus for and method of preserving animal and vegetable substances by displacing air from the vessel containing the substance to be preserved by the introduction therein of an inert fluid, such as water or oil, and then the displacement of such fluid by the introduction of nitrogen gas, or gases having an affinity for oxygen, substantially as explained.

In testimony whereof I have signed my name to this specification in the presence of two subscribing witnesses.

RICHD. JONES.

Witnesses:
    JAMES E. NAYLOR,
    JNO. WILLSDON.